United States Patent
Linares

(10) Patent No.: US 8,420,179 B2
(45) Date of Patent: Apr. 16, 2013

(54) SPRAY APPLICATING PROCESS AND PRODUCTION ASSEMBLY FOR MANUFACTURING A PALLET

(75) Inventor: Miguel A. Linares, Bloomfield Hills, MI (US)

(73) Assignee: Orin Collapsibles, LLC, Auburn Hills, MI (US)

( * ) Notice: Subject to any disclaimer, the term of this patent is extended or adjusted under 35 U.S.C. 154(b) by 0 days.

(21) Appl. No.: 13/275,053

(22) Filed: Oct. 17, 2011

(65) Prior Publication Data
US 2012/0034389 A1 Feb. 9, 2012

Related U.S. Application Data

(62) Division of application No. 12/467,851, filed on May 18, 2009, now Pat. No. 8,176,869.

(60) Provisional application No. 61/074,306, filed on Jun. 20, 2008.

(51) Int. Cl.
*B05D 7/00* (2006.01)
(52) U.S. Cl.
USPC .............. 427/424; 427/421.1; 427/427.1; 427/427.2; 118/500; 118/66; 118/324; 118/641; 118/643; 29/429; 29/430; 29/460
(58) Field of Classification Search ............ 427/421.1, 427/427.1, 427.2; 118/500, 66, 324, 641–643; 29/429, 430, 460
See application file for complete search history.

(56) References Cited

U.S. PATENT DOCUMENTS

| 1,557,935 A | 10/1925 | Henroz |
| 2,383,736 A | 8/1945 | Rembert et al. |
| 2,477,852 A | 8/1949 | Bacon |
| 2,544,657 A | 3/1951 | Cushman |
| 2,709,559 A | 5/1955 | Geisler |
| 2,913,206 A | 11/1959 | Paris |
| 2,914,282 A | 11/1959 | Budd |

(Continued)

FOREIGN PATENT DOCUMENTS

| DE | 19541243 A1 | 5/1997 |
| JP | 02139341 A | 5/1990 |

(Continued)

OTHER PUBLICATIONS

International Search Report—International application No. PCT/US2009/044940, 2010.

*Primary Examiner* — Timothy Meeks
*Assistant Examiner* — Nathan T Leong
(74) *Attorney, Agent, or Firm* — Gifford, Krass, Sprinkle, Anderson & Citkowski, P.C.; Douglas J. McEvoy

(57) ABSTRACT

A production assembly and associated process for mass producing such as a thermoplastic pallet and which utilizes a multiple insert supporting and continuously moving carousels inter-faceable with an input line upon which is transported a plurality of rigid and planar shaped inserts, as well as an output line a spaced relationship from the input line for removing, from the carousel, the resin coated articles. The invention further teaches a series of subset variants for spray applying a two part resin and hardener upon the insert according to a selected thickness, following which the inserts are cured and dried prior to transferring to the output line and in order to create a finished product.

14 Claims, 16 Drawing Sheets

U.S. PATENT DOCUMENTS

| | | |
|---|---|---|
| 3,002,249 A | 10/1961 | Jackson |
| 3,157,910 A | 11/1964 | Schlipphak |
| 3,223,379 A | 12/1965 | Erickson |
| 3,226,764 A | 1/1966 | Hostettler |
| 3,310,616 A | 3/1967 | Beary |
| 3,382,550 A | 5/1968 | Smith et al. |
| 3,412,439 A | 11/1968 | Baker |
| 3,416,203 A | 12/1968 | Ozenne et al. |
| 3,448,496 A | 6/1969 | Arnold et al. |
| 3,556,886 A | 1/1971 | Reusser |
| 3,568,912 A | 3/1971 | de Simas |
| 3,580,190 A | 5/1971 | Fowler |
| 3,587,479 A | 6/1971 | Geschwender |
| 3,590,446 A | 7/1971 | Sonneville |
| 3,659,986 A | 5/1972 | Gelbman |
| 3,675,595 A | 7/1972 | Sullivan |
| 3,710,733 A | 1/1973 | Story |
| 3,719,157 A | 3/1973 | Arcocha et al. |
| 3,720,176 A | 3/1973 | Munroe |
| 3,724,979 A | 4/1973 | Maringer et al. |
| 3,733,157 A | 5/1973 | Hendry |
| 3,801,255 A | 4/1974 | Meyer et al. |
| 3,814,778 A | 6/1974 | Hosoda et al. |
| 3,832,955 A | 9/1974 | Pottinger et al. |
| 3,859,021 A | 1/1975 | Kleiber |
| 3,873,257 A | 3/1975 | Vanotti |
| 3,897,186 A | 7/1975 | Farfor |
| 3,920,369 A | 11/1975 | Boehringer et al. |
| 3,942,926 A | 3/1976 | Bulloch, Jr. |
| 3,955,613 A | 5/1976 | Lund |
| 3,981,956 A | 9/1976 | Redmer et al. |
| 3,982,057 A | 9/1976 | Briggs et al. |
| 3,982,874 A | 9/1976 | Nobbe |
| 3,989,090 A | 11/1976 | Kawai |
| 4,063,864 A | 12/1977 | Oberwelland et al. |
| 4,068,993 A | 1/1978 | Dacey et al. |
| 4,105,383 A | 8/1978 | Hanson |
| 4,197,065 A | 4/1980 | Di Rosa |
| 4,220,100 A | 9/1980 | Palomo et al. |
| 4,279,583 A | 7/1981 | Martin, Sr. |
| 4,312,152 A | 1/1982 | Drury et al. |
| 4,369,024 A | 1/1983 | Blackwood et al. |
| 4,413,964 A | 11/1983 | Winstead |
| 4,456,449 A | 6/1984 | Schubert et al. |
| 4,507,348 A | 3/1985 | Nagata et al. |
| 4,509,637 A | 4/1985 | Browning |
| 4,520,746 A | 6/1985 | Walters et al. |
| 4,589,467 A * | 5/1986 | Hunter ............... 164/326 |
| 4,597,338 A | 7/1986 | Kreeger |
| 4,611,978 A | 9/1986 | Sangiorgi |
| 4,692,499 A * | 9/1987 | Torossian et al. ......... 525/524 |
| 4,715,294 A | 12/1987 | Depew |
| 4,758,148 A | 7/1988 | Jidell |
| 4,802,836 A | 2/1989 | Whissell et al. |
| 4,819,449 A | 4/1989 | Curti et al. |
| 4,829,909 A | 5/1989 | Mandel |
| 4,832,587 A | 5/1989 | Rensen |
| 4,836,762 A | 6/1989 | Davis, Jr. |
| 4,865,882 A * | 9/1989 | Okano et al. ............... 427/195 |
| 4,923,661 A | 5/1990 | Russo |
| 5,023,037 A | 6/1991 | Zullig |
| 5,032,072 A | 7/1991 | Heuschkel |
| 5,035,594 A | 7/1991 | Murayama et al. |
| 5,076,176 A | 12/1991 | Clasen |
| 5,080,840 A | 1/1992 | Jost et al. |
| 5,082,712 A | 1/1992 | Starp |
| 5,143,778 A | 9/1992 | Shuert |
| 5,171,586 A | 12/1992 | Heath |
| 5,194,328 A * | 3/1993 | Suzuki et al. ............... 428/328 |
| 5,205,221 A | 4/1993 | Melin et al. |
| 5,290,165 A | 3/1994 | Pitha |
| 5,304,050 A | 4/1994 | Vismara |
| 5,320,048 A | 6/1994 | Feiner |
| 5,365,858 A | 11/1994 | Kuhns |
| 5,368,466 A | 11/1994 | Hehl |
| 5,382,152 A | 1/1995 | Ravera et al. |
| 5,391,387 A | 2/1995 | Peters |
| 5,395,227 A | 3/1995 | Huggins, Sr. et al. |
| 5,401,456 A | 3/1995 | Alesi, Jr. et al. |
| 5,423,428 A | 6/1995 | Selz |
| 5,445,514 A | 8/1995 | Heitz |
| 5,451,157 A | 9/1995 | Gimenez |
| 5,463,965 A | 11/1995 | Cordrey |
| 5,476,048 A | 12/1995 | Yamashita et al. |
| 5,537,741 A | 7/1996 | Peterson et al. |
| 5,551,353 A | 9/1996 | Fiedler |
| 5,605,102 A | 2/1997 | Simpson |
| 5,612,064 A | 3/1997 | Kosman |
| 5,687,652 A | 11/1997 | Ruma |
| 5,709,913 A | 1/1998 | Andersen et al. |
| 5,769,949 A | 6/1998 | Cienkus et al. |
| 5,846,576 A | 12/1998 | Braungardt et al. |
| 5,868,080 A | 2/1999 | Wyler et al. |
| 5,901,774 A * | 5/1999 | Hunter et al. ............... 164/324 |
| 6,093,011 A | 7/2000 | Kosman |
| 6,209,464 B1 | 4/2001 | Elder |
| 6,224,363 B1 | 5/2001 | Mahan et al. |
| 6,294,114 B1 | 9/2001 | Muirhead |
| 6,357,366 B1 | 3/2002 | Frankenberg |
| 6,524,426 B1 | 2/2003 | St. John et al. |
| 6,530,330 B2 | 3/2003 | Sepe et al. |
| 6,530,769 B1 | 3/2003 | Rondeau et al. |
| 6,569,509 B1 | 5/2003 | Alts |
| 6,582,216 B2 | 6/2003 | Kosman |
| 6,598,541 B2 | 7/2003 | Vilkki |
| 6,655,299 B2 | 12/2003 | Preisler et al. |
| 6,705,237 B2 | 3/2004 | Moore, Jr. et al. |
| 6,745,703 B2 | 6/2004 | Torrey et al. |
| 6,863,003 B2 | 3/2005 | Grainger |
| 6,938,559 B2 | 9/2005 | Wullenweber |
| 6,954,982 B2 | 10/2005 | Isle et al. |
| 6,972,144 B2 | 12/2005 | Roth et al. |
| 6,976,437 B2 | 12/2005 | Fisch et al. |
| 7,013,814 B2 | 3/2006 | Modesitt et al. |
| 7,143,564 B2 | 12/2006 | Renck |
| 7,150,621 B2 | 12/2006 | Molin |
| 7,197,989 B2 | 4/2007 | Apps |
| 7,238,073 B2 | 7/2007 | Hendrickson |
| 7,255,551 B2 | 8/2007 | Taylor et al. |
| 7,309,226 B2 | 12/2007 | Hansen et al. |
| 7,458,800 B2 | 12/2008 | Scherer et al. |
| 7,469,643 B2 | 12/2008 | Isle et al. |
| 7,658,958 B2 | 2/2010 | Hansen |
| 7,726,248 B2 | 6/2010 | Shuert |
| 7,804,400 B2 | 9/2010 | Muirhead |
| 7,819,068 B2 | 10/2010 | Apps et al. |
| 8,047,886 B1 | 11/2011 | McLarty et al. |
| 2002/0106483 A1 | 8/2002 | Obeshaw |
| 2002/0134311 A1* | 9/2002 | Yoshino et al. ............... 118/719 |
| 2002/0148393 A1 | 10/2002 | Milles |
| 2003/0024443 A1 | 2/2003 | Hoshi |
| 2003/0041956 A1 | 3/2003 | Pigott et al. |
| 2003/0070594 A1 | 4/2003 | Isle et al. |
| 2003/0118681 A1 | 6/2003 | Dahl et al. |
| 2003/0136315 A1 | 7/2003 | Kim |
| 2003/0189152 A1 | 10/2003 | Elder et al. |
| 2004/0007164 A1 | 1/2004 | Herring et al. |
| 2004/0187745 A1 | 9/2004 | Rojas et al. |
| 2005/0076816 A1 | 4/2005 | Nakano |
| 2005/0211139 A1 | 9/2005 | Perrotta et al. |
| 2005/0241548 A1 | 11/2005 | Muirhead |
| 2006/0003044 A1 | 1/2006 | DiNello et al. |
| 2006/0075939 A1 | 4/2006 | Shuert |
| 2006/0130712 A1 | 6/2006 | Wang |
| 2006/0134254 A1 | 6/2006 | Hansen et al. |
| 2006/0144301 A1 | 7/2006 | Borggaard |
| 2006/0191465 A1 | 8/2006 | Marcellus |
| 2006/0201402 A1 | 9/2006 | Moore et al. |
| 2006/0204665 A1* | 9/2006 | Buczek et al. ............ 427/421.1 |
| 2006/0235780 A1 | 10/2006 | Carney |
| 2006/0288915 A1 | 12/2006 | Kulbeth et al. |
| 2007/0113759 A1* | 5/2007 | Roth et al. .................... 108/161 |
| 2007/0215014 A1 | 9/2007 | Lee |
| 2007/0283857 A1 | 12/2007 | Dong |
| 2008/0053596 A1 | 3/2008 | Davies et al. |
| 2008/0060561 A1 | 3/2008 | Carrasco |
| 2008/0098935 A1 | 5/2008 | Roth et al. |

| | | | | | | |
|---|---|---|---|---|---|---|
| 2008/0103944 A1 | 5/2008 | Hagemann et al. | JP | 2000085021 A | 3/2000 | |
| 2008/0110377 A1 | 5/2008 | Stevens | JP | 2001-328632 A | 11/2001 | |
| 2008/0156234 A1 | 7/2008 | van de Camp | JP | 2002166940 A | 6/2002 | |
| 2008/0196633 A1 | 8/2008 | Ho | JP | 2003011969 A | 1/2003 | |
| 2008/0210140 A1 | 9/2008 | Valentinsson | JP | 2003-034330 A | 2/2003 | |
| 2009/0095172 A1 | 4/2009 | Madgar | JP | 2003-267370 A | 9/2003 | |
| 2009/0188096 A1 | 7/2009 | Townsend et al. | JP | 2004090988 A | 3/2004 | |
| 2010/0154685 A1 | 6/2010 | Arinstein | JP | 2005104562 A | 4/2005 | |
| 2011/0240800 A1 | 10/2011 | Fox, Jr. | JP | 2006036315 A | 2/2006 | |
| | | | JP | 2006036331 A | 2/2006 | |

FOREIGN PATENT DOCUMENTS

| | | | | | |
|---|---|---|---|---|---|
| JP | 03029744 A | 2/1991 | JP | 2006298403 A | 11/2006 |
| JP | 06156493 A | 6/1994 | JP | 2008023741 A | 2/2008 |
| JP | 06-235780 A | 8/1994 | JP | 2008087839 A | 4/2008 |
| JP | 08034014 A | 2/1996 | KR | 20030034370 A | 5/2003 |
| JP | 08034438 A | 2/1996 | KR | 10-0577441 | 5/2006 |
| JP | 08336866 A | 12/1996 | KR | 1020090117107 | 11/2009 |
| JP | 11079180 A | 3/1999 | WO | WO-2006082595 A1 | 8/2006 |
| JP | 11221828 | 8/1999 | | | |

* cited by examiner

SPRAY APPLICATING PROCESS AND PRODUCTION ASSEMBLY FOR MANUFACTURING A PALLET

CROSS-REFERENCE TO RELATED APPLICATIONS

This application is a divisional of U.S. patent application Ser. No. 12/467,851 filed May 18, 2009, which in turn claims the benefit of U.S. Provisional Application 61/074,306 filed on Jun. 20, 2008.

FIELD OF THE INVENTION

The present invention is directed to the production assemblies for creating a reinforced pallet exhibiting a resin exterior encasing an inner rigid core. More specifically, the present invention discloses a production assembly and associated process for mass producing such a thermoplastic pallet and which utilizes a multiple insert supporting and continuously moving carousel inter-faceable with an input line upon which is transported a plurality of rigid and planar shaped inserts, as well as an output line a spaced relationship from the input line for removing, from the carousel, the resin coated articles. The invention further teaches a series of subset variants for spray applying a two part resin and hardener upon the insert according to a selected thickness and in order to create a finished pallet.

BACKGROUND OF THE INVENTION

The prior art is well documented with examples of plasticized or resinous based pallet constructions. In each case, the pallet construction includes some form of reinforcement or support, around and/or over which is applied a synthetic composition. A shortcoming of the prior art is the ability to produce the pallets in volumes satisfactory for demand.

SUMMARY OF THE INVENTION

The present invention discloses an assembly for mass production of a resin coated article, such as a thermoplastic coated rigid substrate material for use such as in a pallet. An input conveyor line transports a plurality of the inserts, these further including such as a rigid substratum material including a durable cardboard or other rigid construction.

One or more carousel type conveyors extend between the input line and a spaced apart output line. Each of the carousel type conveyors include a plurality of spaced apart carriers, these further including a downward extending arm terminating in a rotating spindle and such as which seats through a central recess defined in each insert in order to optionally rotate the inserts while supported upon and transferred along the conveyor.

A first lift and transfer mechanism is communicable between the input line and the conveyor for collecting, in succession, inserts for transferring to individual carriers. A spray booth encloses a portion of the carousel conveyor and through which the carriers travel for applying a curable resin, typically a two part resin and hardener, material upon the inserts.

A curing operation follows the spray booth and can include, in one variant, a dry booth through which the carrier supported articles are transferred. In a further variant, a plurality of mold each exhibit a pair of clamshell halves which are supported upon an underneath positioned conveyor in communication with the downwardly extending carrier supporting by the overhead carousel. The mold halves are configured to enclose the coated insert for curing as the clamshell molds proceed toward the output line and, prior to removal, can be reacquired by the overhead carrier.

A second lift and transfer mechanism removes the finished article from the carrier for depositing upon the output line. Each of the first and second lift and transfer mechanisms are numerically controlled and further include an articulating arm terminating in widthwise extending gripping portion configured for grasping and transferring the inserts to and from the carriers.

A further variant includes a first metal coating applied to each of the inserts, with a second metal particulate entrained within the resin material. The metals are each subjected to an opposite metal charge in order to create an electrostatic holding force there-between to influence even coating and adherence of the resin across both upper and lower surfaces of the insert. Other features include a mold maintenance and repair area in communication with the underneath positioned conveyor for removing a selected mold from the assembly, such as when repairs are required.

A corresponding method for producing a resin coated article is also provided and includes the steps of conveying an insert along an input line, transferring the insert to a carousel, advancing the insert to a first location for applying a resin material, further advancing the insert to a second location for curing the resin material around the insert, and depositing the coated article upon an output line. Additional steps include applying the resin as a spray within a booth through which the insert is conveyed.

Other steps include rotating the inserts while supported upon the carousel, as well as advancing the insert through a dry booth succeeding the spray booth. Alternative to the dry booth, the insert can be transferring from the carousel to a clamshell mold, following which the carousel reacquires the insert and prior to removal by the second lift and transfer mechanism. A subset step includes conveying the clamshell mold upon a secondary conveyor positioned underneath the carousel and, when necessary retiring the mold to a maintenance/repair area as needed.

Yet additional steps provide for utilizing electromagnetic generated electrostatic holding forces for accomplishing more even and consistent application of the spray resin material to the insert. This includes the steps of applying a first metal coating to the insert, intermixing a second metal particulate within the resin material, oppositely charging each of the metals, and spray applying the resin to the insert in order to create an electrostatic holding force there-between and to influence even coating and adherence of the resin across both upper and lower surfaces of the insert.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
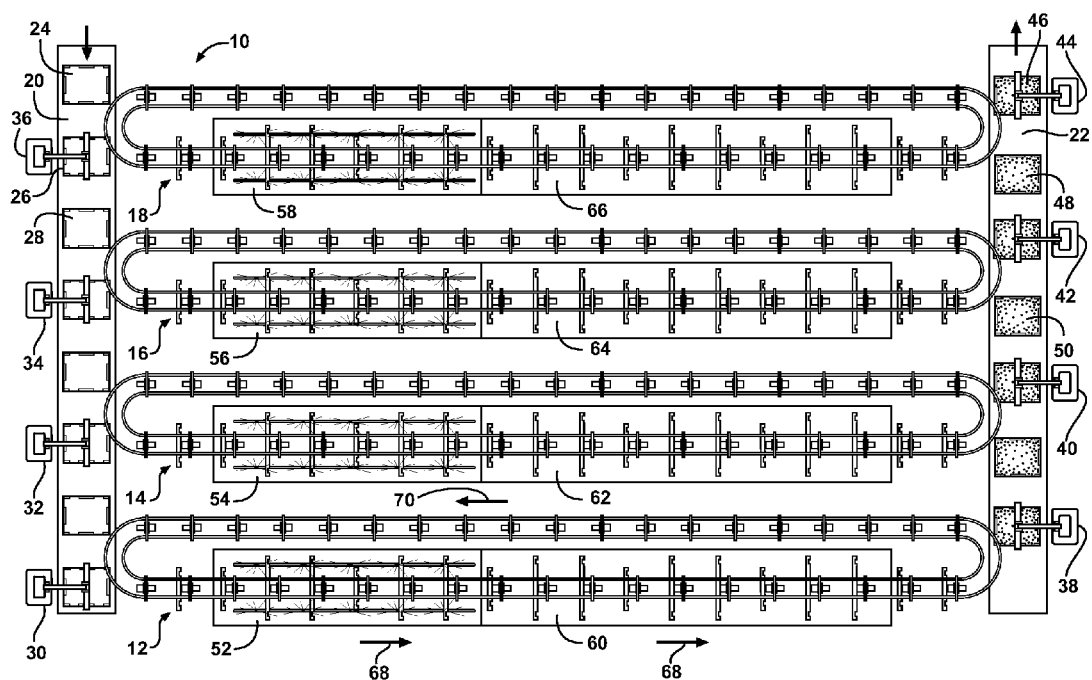
FIG. 1 is an overhead illustration of a spray applicating process according to a first embodiment and in which a plurality of individual carousel assembly lines extend in a continuous looped fashion between an insert supporting input line and a finished article output line.

Referring now to FIG. 1, an overhead illustration is shown at 10 of a spray applicating process according to a first embodiment, and in which a plurality of individual carousel assembly lines (illustrated by four such lines shown at 12, 14, 16 and 18) extend in a continuous looped fashion between a pair of spaced apart conveyors including a common core (or insert) supporting and input supply line 20 and a finished article output line 22. Referring further to FIGS. 2-7 in succession, a series of views are shown of the variant 10 in FIG. 1 for producing a resin coated article, such as a thermoplastic formed and reinforced pallet construction, according to the first embodiment 10.

As will be discussed in further detail, the present invention enables mass production of resin coated articles, such as pallets or the like, and which is not available with current production methods and techniques. The present invention contemplates incorporating any number of individual conveyor lines in the present assembly, this including the adding of new conveyor lines as well as selective activation and deactivation of one or more existing lines in order to scale up or down the desired volume of completed resin coated products (e.g. resin coated pallets).

Although not further shown, it is understood that appropriate control and processor capabilities are incorporated into the overall assembly, and which synchronize the transport speed and operation of the insert input (supply) line 20, output line 22 and inter-disposed carousel assembly lines 12, 14, 16 and 18, as well as associated lift and transport mechanisms located in communication with both the input and output conveyor lines. For purposes of ease of illustration, sectional views FIGS. 2-7 will focus on the features associated with selected carousel 12, it being understood that each of the additional carousel assembly lines are identically constructed such that a repetitive description of each corresponding feature associated with the other lines 14, 16 and 18 is not provided.

In combination with the succeeding sectional views of FIGS. 2-7, the inserts are shown at 24, 26, 28, et. seq. supported upon the input conveyor line 20 and which continuously transferred for acquisition by each of the carousel type conveyors 12-18. The inserts are generally planar shaped, with a given thickness and, as further shown, can exhibit a desired honeycombed or otherwise apertured design between upper and lower faces thereof (not shown).

In one non-limiting application, the inserts can be constructed of a rigid paperboard or particle board material and which, when coated with the desired composite resin, provides an extremely durable, weight and weather resistant article including most notably a resin coated pallet. That said, the assembly and process is contemplated to also encompass the manufacture of any resin coated article not limited to a pallet and including any form of wall board, flooring or other item which benefits from the incorporation of a permanent and interior insert or spine, combined with a mold assembly process including the assembly of upper and lower mold halves about the insert and into which is admitted a curable/settable resin matrix.

As further most generally shown in FIG. 1, a plurality of first lift and transfer mechanisms are referenced at 30, 32, 34 and 36 communicating with both the input line 20 and an acquisition location of the closed loop carousel conveyors 12, 14, 16 and 18. A second plurality of lift and transfer mechanisms further being referenced at 38, 40, 42 and 44 at a retrieval location of each carousel line for removing and depositing, on the output line 22, a plurality of finished and resin coated articles, further shown at 46, 48, 50, et. seq. Each of the carousel conveyors, as most generally shown in FIG. 1, further includes an initial spray booth location, see at 52, 54, 56, and 58, following which is located at dry/cure booth 60, 62, 64 and 66. Each of the carousels, as referenced by selected carousel 12, exhibits an elongated and closed loop configuration which further includes a first forward extending assembly line portion, see arrows 68 extending through the spray and dry booths, and an interconnecting and return line, see further arrow 70.

Figure 2:
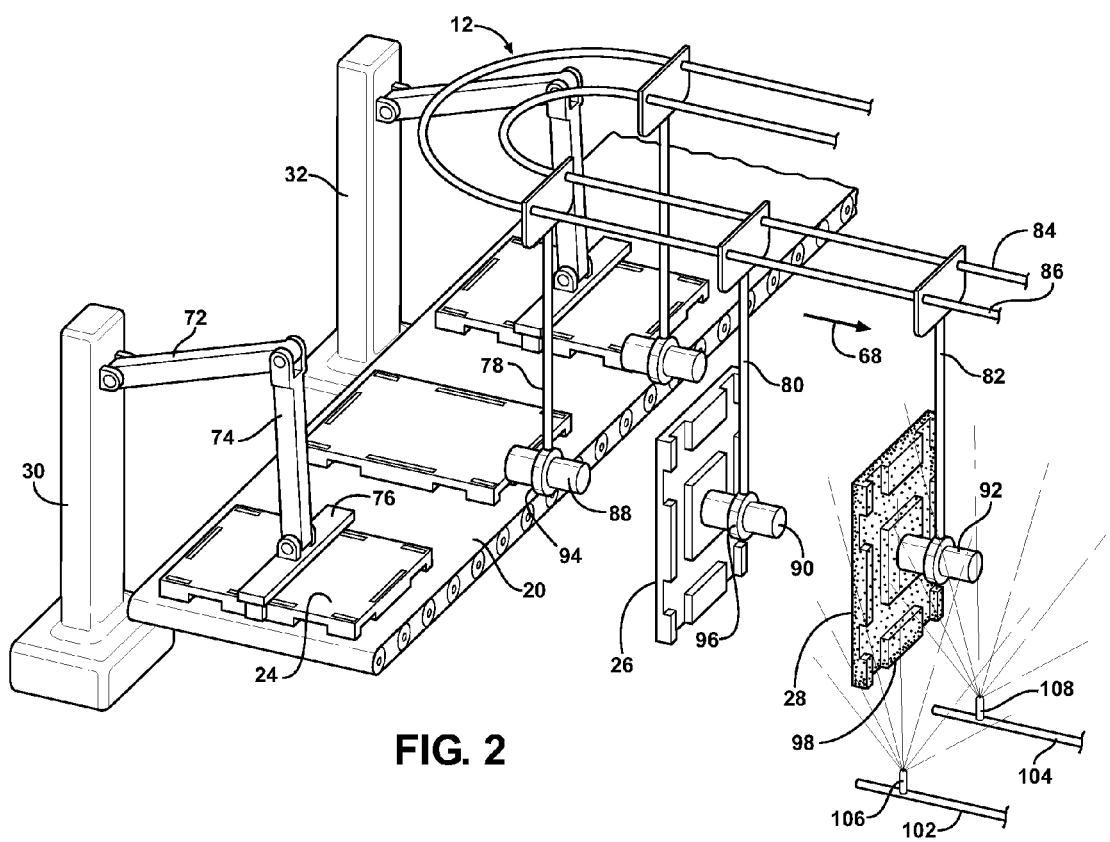
FIG. 2 is a sectional perspective of an input side of the assembly shown in FIG. 1 and in which a first automated acquisition and transfer assembly is located in communication with both a selected carousel assembly line and a location of the input line, the first automated assembly being articulated to permit an associated gripping portion to acquire a selected insert from the input line.

FIG. 2 is an initial sectional perspective of an input side of the assembly shown in FIG. 1 and in which a first selected automated acquisition and transfer assembly, see at 30, is located in communication with both the selected carousel assembly line 12 and a location of the input line 20. As with each of the additional input side located transfer assemblies 32, 34, and 36 (and as well as with all of the output side transfer assemblies 38-44), each of the first and second lift and transfer mechanisms are numerically controlled and further include an articulating arm, see first and second pivotally interconnected arm portions 72 and 74 associated with selected lift and transfer assembly 30. The second arm portion 74 terminates in a widthwise extending gripping portion, see at 76 which is both configured and numerically operated for grasping and transferring the inserts 24, 26, 28, et seq. to the carousels (again shown as selected carousel 12).

Each of the carousel carriers includes a plurality of spaced apart carrier portions, see as shown by downwardly extending arms 78, 80, 82, et seq. associated with indicated carousel 12. The arms 78, 80, 82, et seq. are fixedly engaged at respective upper ends between a pair of spaced apart support members (see at 84 and 86) associated with the selected carousel 12. A rotatable spindle, as shown at 88, 90, 92, et seq. for each of arms 78, 80, 82, et. seq., being supported at a lower end of each support arm (see further end-positioned and fixed journalled supports 94, 96, 98, et seq., through which the spindles are rotatably and supportably driven. It is further envisioned and understood that the individual carriers and spindles can be constructed to rotate at a given speed or rate and concurrent with the carriers being continuously advanced by supporting/suspending carousel. Other variants also contemplate fixed (non-rotative) support of the inserts during either or both of the spray applicating and curing processes.

As shown in FIG. 2, the numerically operated arms 72 and 74 of the first lift and transfer assembly 30 are articulated so that the end positioned gripping portion 76 fastens to and elevates the selected insert 24 in a widthwise supported fashion and in order to acquire the insert from the input line. As shown in FIG. 1, it is understood and envisioned that the arrangement of the multiple carousels with associated lift and transfer mechanisms is provided so that each line acquires a steady progression of inserts in a continuous and concurrent fashion, such that the potential output of the assembly can approach upwards of one completed resin coated article per second, more or less.

Figure 3:
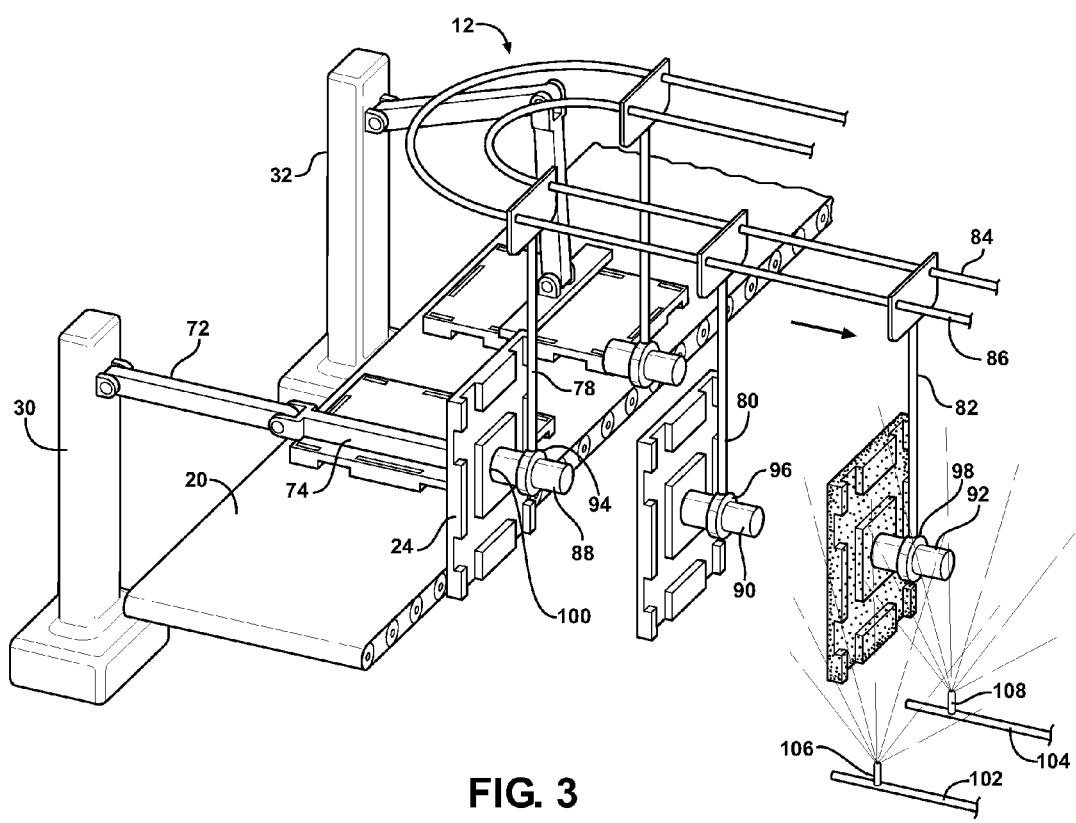
FIG. 3 is a succeeding illustration to that shown in FIG. 2 and showing the selected automated lift and transfer mechanism fully extended so that the gripping portion deposits the insert upon a selected carrier associated with the carousel.

Proceeding next to FIG. 3, a succeeding illustration to that shown in FIG. 2 illustrates the selected automated lift and transfer assembly fully extended (see arms 72 and 74) so that the gripping portion deposits the insert 24 upon the spindle 88 associated with the selected carrier arm 78 associated with the carousel 12. A central recess location, see as best shown at 100 in FIG. 3 associated with selected insert 24, is referenced in relation to an underside of the insert article and such that the outer annular wall edges of the spindle 88 are adapted to seat snugly and in engaging fashion in order to secure each of the inserts when conveyed along the carousels.

Figure 4:
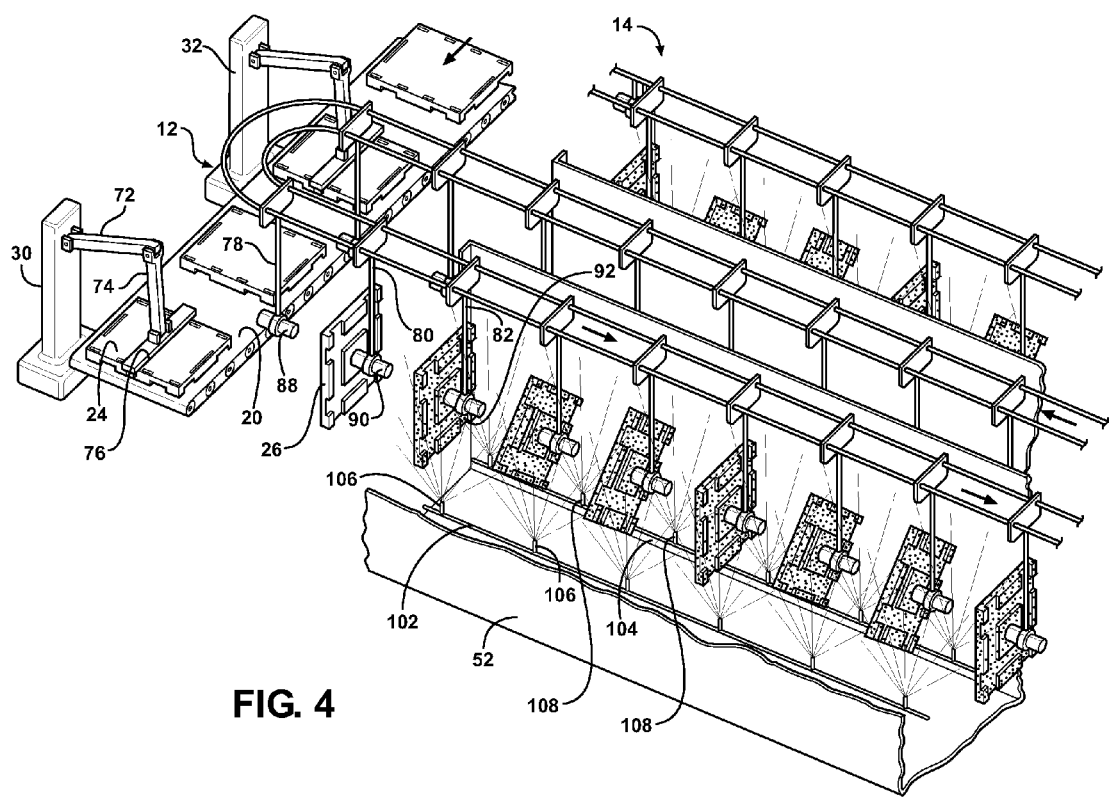
FIG. 4 is a succeeding illustration to FIG. 3 and showing a spray booth enclosing an assembly portion of the carousel line for applying a two part resin and hardener to each insert supported upon a carrier which is translated through the booth interior in a progressively rotating fashion.

FIG. 4 is a succeeding illustration to FIG. 3 and shows in cutaway the spray booth 52 enclosing an assembly portion of the carousel line 12. As further shown in each of FIGS. 2 and 3, a pair of underside positioned and lengthwise extending conduit lines are provided at 102 and 104, from these respectively projecting upwardly pluralities of lengthwise spaced spray nozzles 106 and 108, for applying such as a two part resin and hardener to each insert supported upon a carrier which is translated through the booth interior. It is further envisioned that any arrangement or configuration of resin spray can be incorporated within a suitably configured spray booth, the arrangement shown consisting of but one desirable arrangement in which a three dimensional profile of spray is applied in an upwards projecting fashion, following which the combined effects of gravity exerted on the spray along with the translational influencing of each of the inserts combine to result in even application and adherence of a build up resin coating to the top, bottom and sides of the inserts in an equal and progressing fashion.

Figure 5:
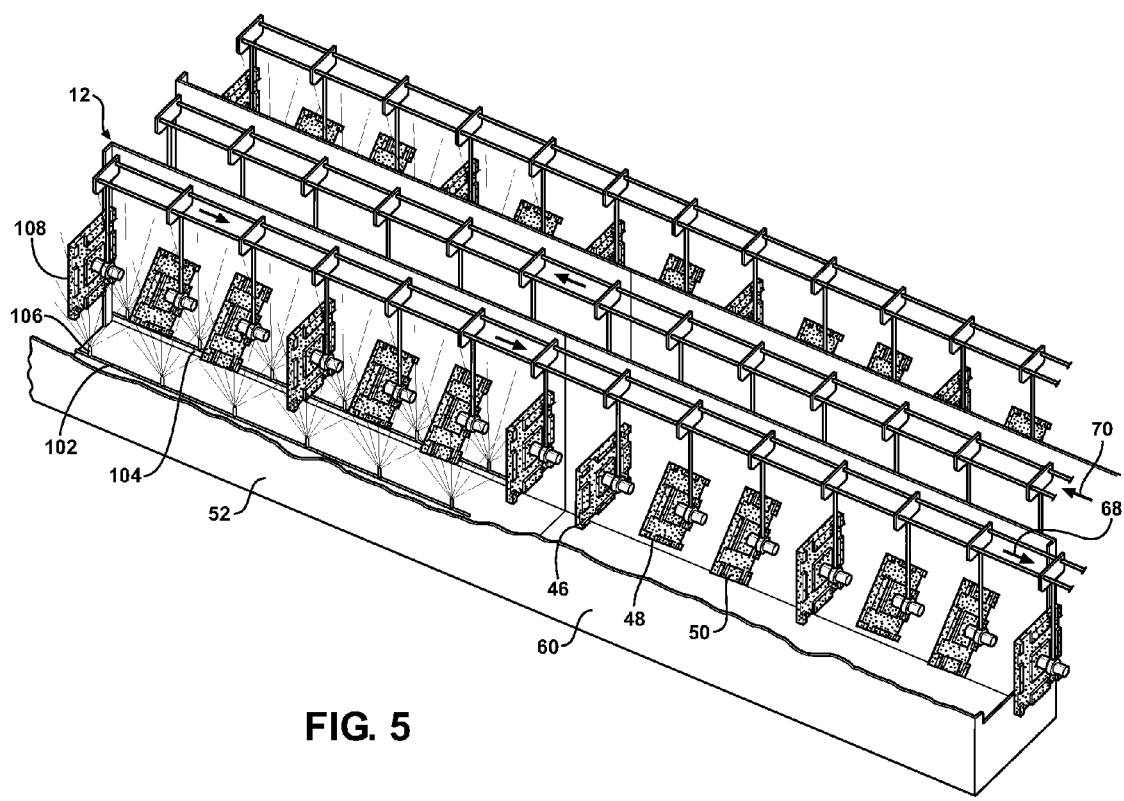
FIG. 5 is a succeeding illustration to FIG. 4 and showing a dry/cure booth through which the inserts are translated in continuous carrier supported and rotating fashion.

FIG. 5 is a succeeding illustration to FIG. 4 and shows again the dry/cure booth 60 through which the inserts are translated in continuous carrier supported fashion. As further illustrated by the progression of carriers shown in each of FIGS. 4 and 5, illustrated is the manner in which the spindle supported inserts are progressively rotated by the spindles through both the spray booth and succeeding dry/cure booth. This is provided in the spray portion of the assembly in order to provide both an even and continuous coat of resin spray (again such as a type part resin and hardener) and while minimizing drips, streaks or running of the resin. Further rotation of the coated inserts in the curing booth also enhances even drying of the coated parts as they convey towards the output line 22. It is further understood that the translational speed and rotational velocity of the carousel supporting carriers can further be modified to adjust to the drying properties of the resin applied to the given insert material.

Figure 6:
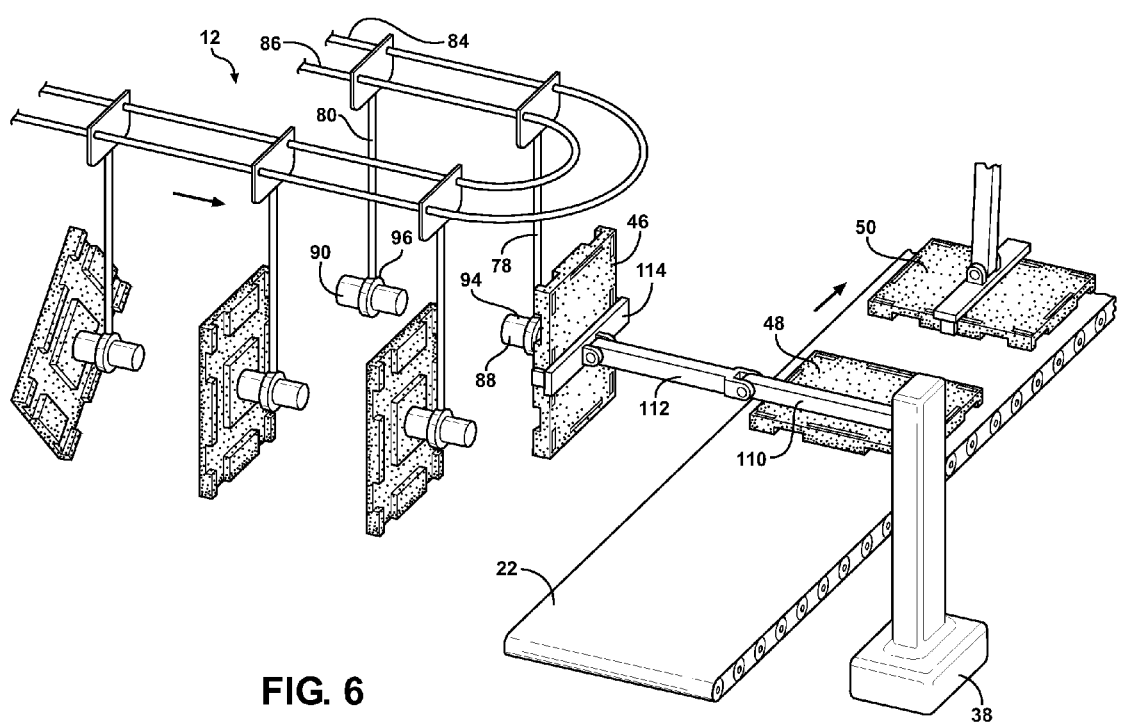
FIG. 6 is a sectional perspective of an output side of the process shown in FIG. 1 and in which a second automated acquisition and transfer mechanism is located in communication with a both the selected carousel and a location of the output line, the second mechanism being fully extended so that the associated gripping portion acquires a finished resin coated article from the carrier.

Referring now to FIG. 6, a sectional perspective is shown of an output side of the assembly and process shown in FIG. 1, and in which a second automated acquisition and transfer mechanism, see again selected assembly 38, is located in communication with a both the selected carousel 12 and a most upstream location of the output line 22. The second lift and transfer mechanisms are again identically constructed to the first lift and transfer assemblies and again include a pair of pivotally interconnected arms 110 and 112, the arm 112 terminating in a widthwise extending gripping portion 114.

Figure 7:
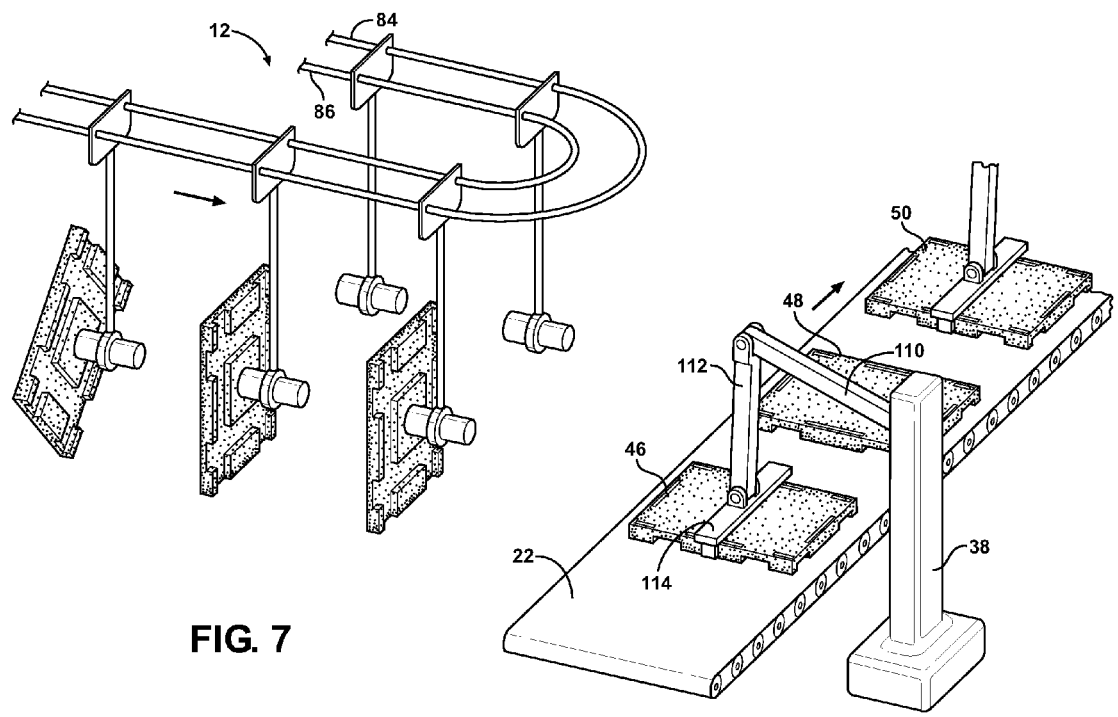
FIG. 7 is a succeeding illustration to that shown in FIG. 6 and in which the second automated lift and transfer mechanism is articulated to permit the gripping portion to deposit the finished article upon the output line.

As shown in FIG. 6, the second assembly 38 is being fully extended so that the associated gripping portion 114 acquires a finished resin coated article (again representatively shown at 46) from the selected carrier 78 with associated spindle 88, such as following the carrier exiting the dry/cure booth with the insert. FIG. 7 is a succeeding illustration to that shown in FIG. 6 and in which second automated mechanism 38 is articulated to permit the gripping portion to deposit the finished article upon the output line 22 in a likewise progressive fashion and for removing the finished articles from the assembly, and with the now empty carriers progressing along the reverse return line 70 for repeating the process at FIG. 2.

Figure 8:
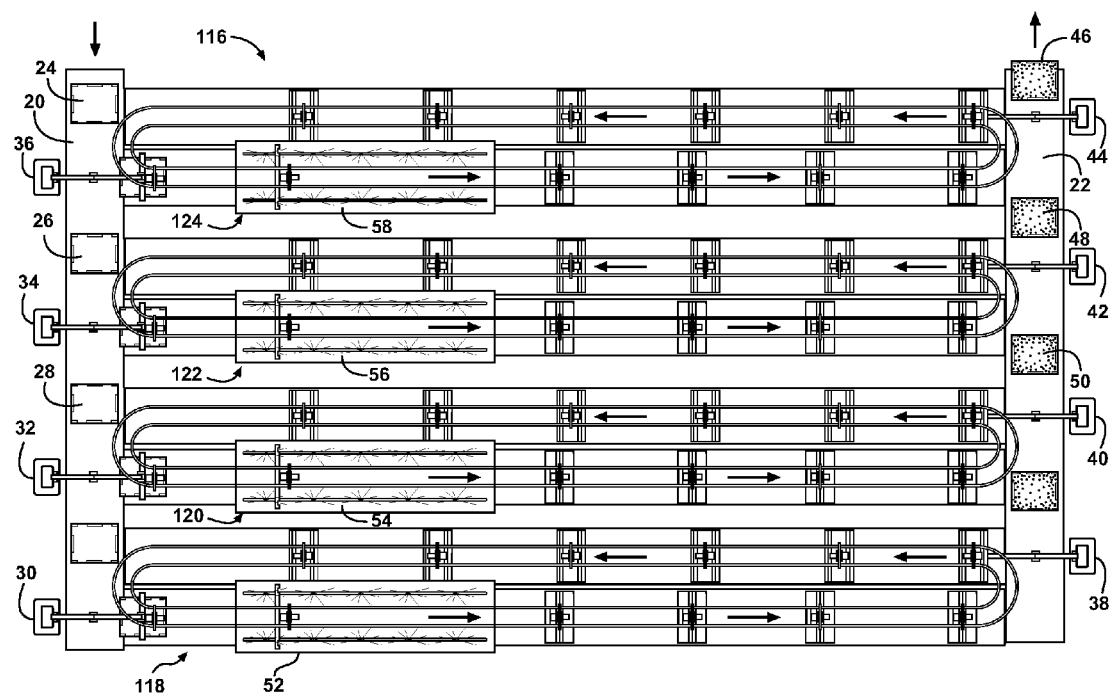
FIG. 8 is an overhead illustration of a combined spray applicating and clamshell style clamping/curing process according to a second embodiment and in which a plurality of individual carousel assembly lines extend in a continuous looped fashion between an insert supporting input line and a finished article output line.

Referring to FIG. 8, with succeeding reference to dedicated sectional views FIGS. 9-13, a modified assembly is generally shown in overhead illustration at 116 of a combined spray applicating and clamshell style clamping/curing process according to a second embodiment. Identical elements also previously described and shown in the first embodiment of FIGS. 1-8 are likewise numbered in the second embodiment without additional explanation and for ease of illustration.

As with the first embodiment 10 the modified embodiment 116 includes a plurality of individual carousel assembly lines 118, 120, 122 and 124 extending in a continuous looped fashion between the insert supporting input line 20 and finished article output line 22. Identical to the first embodiment, the provision of the input and output side lift and transfer mechanisms 30-36 and 38-44 are repeated, as is the provision of the first stage resin spray booth 52-58 associated with an assembly portion of each carousel assembly 118-124.

Figure 9:
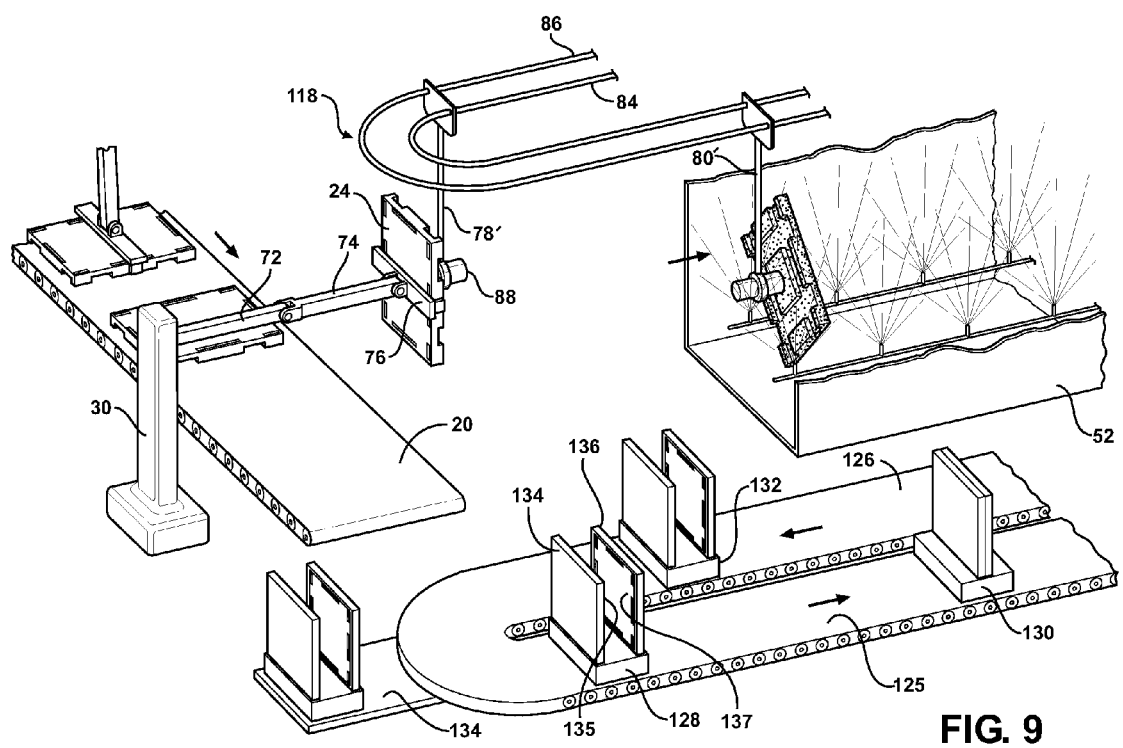
FIG. 9 is a sectional perspective of an input side of the assembly shown in FIG. 8 and in which a first automated acquisition and transfer assembly is located in communication with both a selected carousel assembly line and a location of the input line, the carousel assembly line including an overhead carrier supporting and conveying portion in addition to an underneath positioned and mold clamshell conveying portion, the first automated assembly being articulated to permit an associated gripping portion to acquire a selected insert from the input line as well as to deposit it upon a selected carrier associated with the overhead carousel which then enters a first end of a spray booth enclosing an assembly portion of the carousel line for applying a two part resin and hardener to each insert supported upon a carrier which is translated through the booth interior in a progressively rotating fashion.

As further referenced in the sectional perspective of FIG. 9, and showing an input side of the selected carousel assembly 118 shown in FIG. 8, a first automated acquisition and transfer mechanism 30 is located in communication with both selected carousel assembly line 118 and a location of the input line 20. As with the variant of FIG. 1, the carousel assembly line 118 includes an overhead carrier supporting and conveying portion (see supports 84 and 86 from which are suspended a modified version, see at 78', of support arm.

Each of the support arms, such as represented by selected arm 78', is capable of being extensible/retractable (see as further shown at varied positions 78" in each of FIGS. 10 and 11), such as through a defined telescoping arrangement or other construction, in order to selectively communicate the associated insert 24 (see again rotatably driven spindle support 88) with an underneath positioned and mold clamshell conveying portion, see as best shown at 126 in FIG. 9 and corresponding to selected and overhead positioned carousel type conveyor 118. The conveyor 126 is identical in configuration and direction of travel to its associated overhead carousel 118 and supports a plurality of individual molds, see as shown at 128, 130, 132, et seq., these consisting of a combined clamping and curing step which substitutes for the dry booth shown in the first embodiment.

Each of the individual molds exhibits a pair of clamshell halves which are supported upon the underneath positioned and likewise closed loop conveyor, this including forward portion 125 and return portion 126 in continuous and proximate communication with the downwardly extending carrier supporting by the overhead carousel. The mold halves are shown in a first open position in reference to selected pair 134 and 136 associated with mold 128. The mold halves are selectively opened or closed, such as in the fashion shown, with inner opposing faces (see at 135 and 137 of mold halves 134 and 136 in FIG. 9) collectively exhibiting a desired interior profile or recess configuration suitable for encasing about a selected and pre-resin coated insert for curing, this further occurring as the clamshell molds 128, 130, 132 proceed toward the output line 22.

Referring to FIG. 9, the first automated assembly 30 is articulated to permit an associated gripping portion 76 to acquire a selected insert 24 from the input line 20 and to deposit it upon selected carrier arm 78' associated with the overhead carousel 118. At this point, the carriers with supported inserts enter a first end of spray booth 52 enclosing an assembly portion of the carousel line for applying a two part resin and hardener to each insert as it is translated through the spray booth interior in a progressively rotating fashion. As further shown in FIG. 9, a selected mold maintenance and repair area can be provided, such as at 133 in proximity to an inlet proximate rounded corner location of the mold supporting conveyor, and to which can be retired a selected mold for repair on an as-needed basis.

Figure 10:
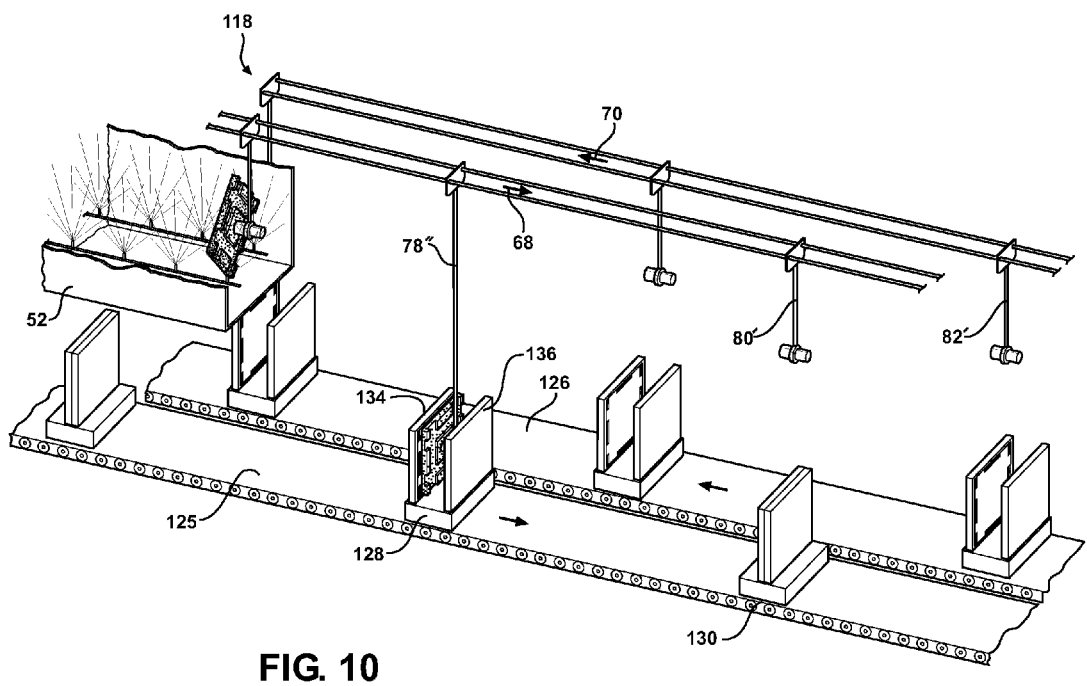
FIG. 10 is an illustration of a selected carrier exiting the spray booth with a resin coated and pre-cured article, the carrier being vertically extensible to cause the uncured item to be sandwich received between a selected pair of mold clamshell halves associated with the underneath positioned conveying portion, these being interiorly configured and dimensioned to subsequently close to seat about the spray coated item for curing as the clamshell molds proceed toward the output line.

As further shown in FIG. 10 is an illustration of a selected carrier exiting the spray booth with a resin coated and pre-cured article, the carrier then being vertically extensible, see extended arm shown at 78", at which point the pre-coated but as yet uncured item is deposited in sandwiching fashion between selected pair of mold clamshell halves 134 and 136 associated with the underneath positioned conveying portion 128 while traveling on forward conveyor portion 125. The mold halves are then caused to subsequently close and seat about the spray coated item for curing as the clamshell molds proceed toward the output line 22. The mold interior can be heated to facilitate curing during the period in which the closed molds translate from the receipt location of the insert in FIG. 10.

Figure 11:
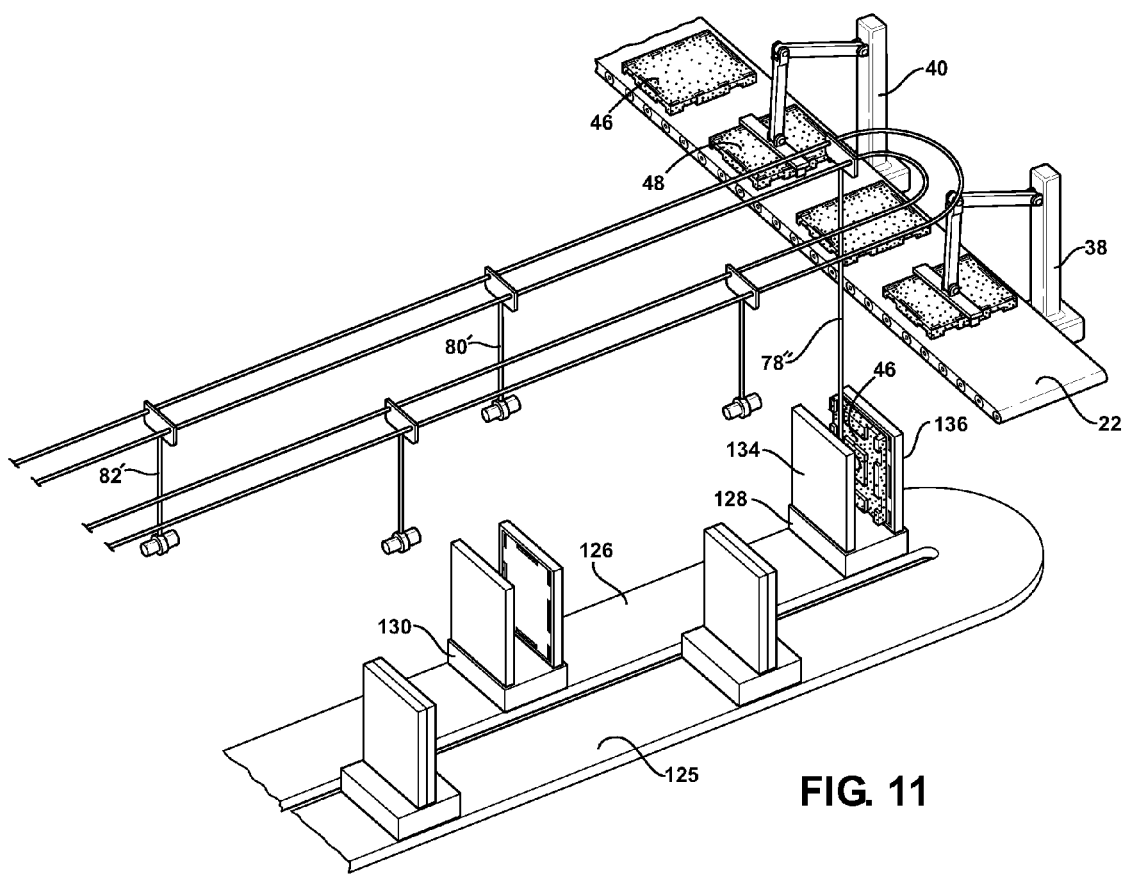
FIG. 11 is a succeeding illustration of each succeeding clamshell mold successively opening, upon cornering an output end, for permitting removal of a finished article by a vertically re-extended carrier.

FIG. 11 is a succeeding illustration of each succeeding clamshell mold successively opening, see again selected mold 128 with displaceable mold halves 134 and 136 and which upon upon cornering an output end of the underneath position conveyor. At this point, the selected carrier arm is again extended to its maximum position at 78"', for permitting retrieval and removal of the finished resin article 46.

Figure 12:
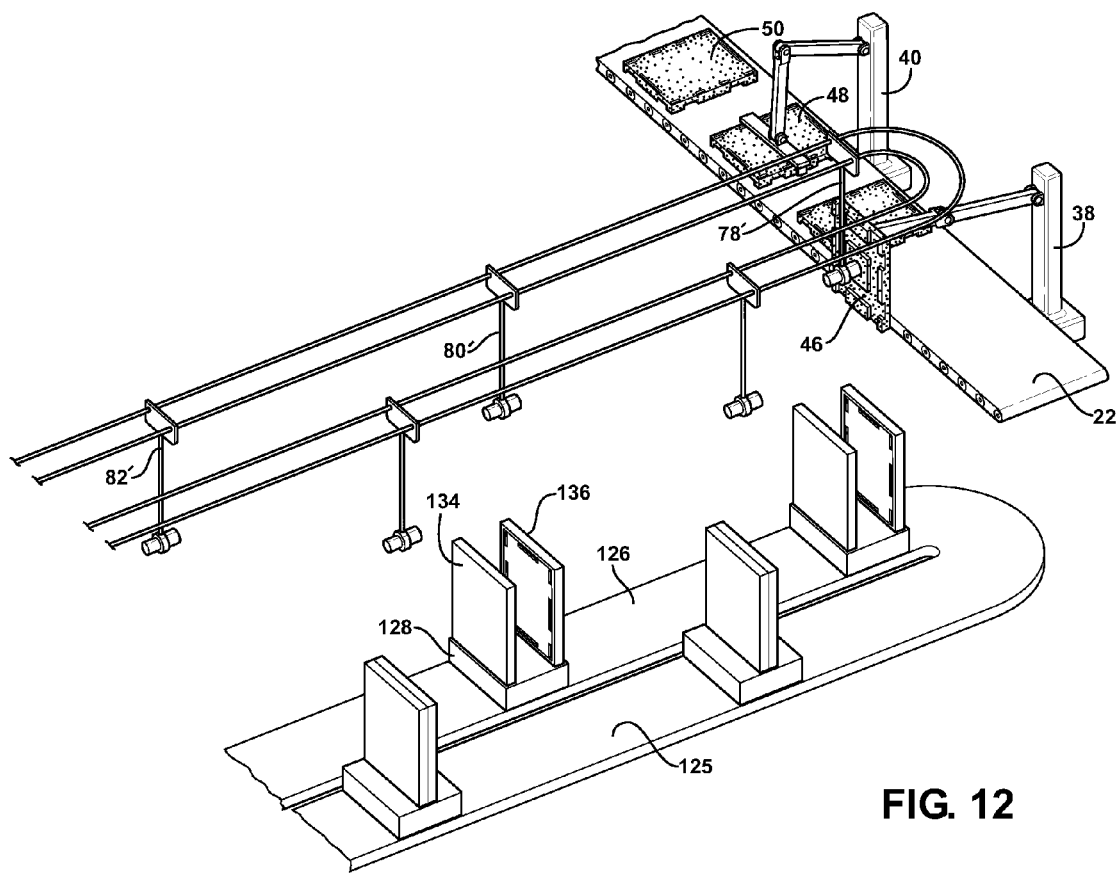
FIG. 12 is a succeeding illustration showing a second automated acquisition and transfer assembly located in communication with a both the selected carousel supported carrier and a location of the output line and which is shown fully extended to permit its associated gripping portion to receive the finished article from the carrier.
Figure 13:
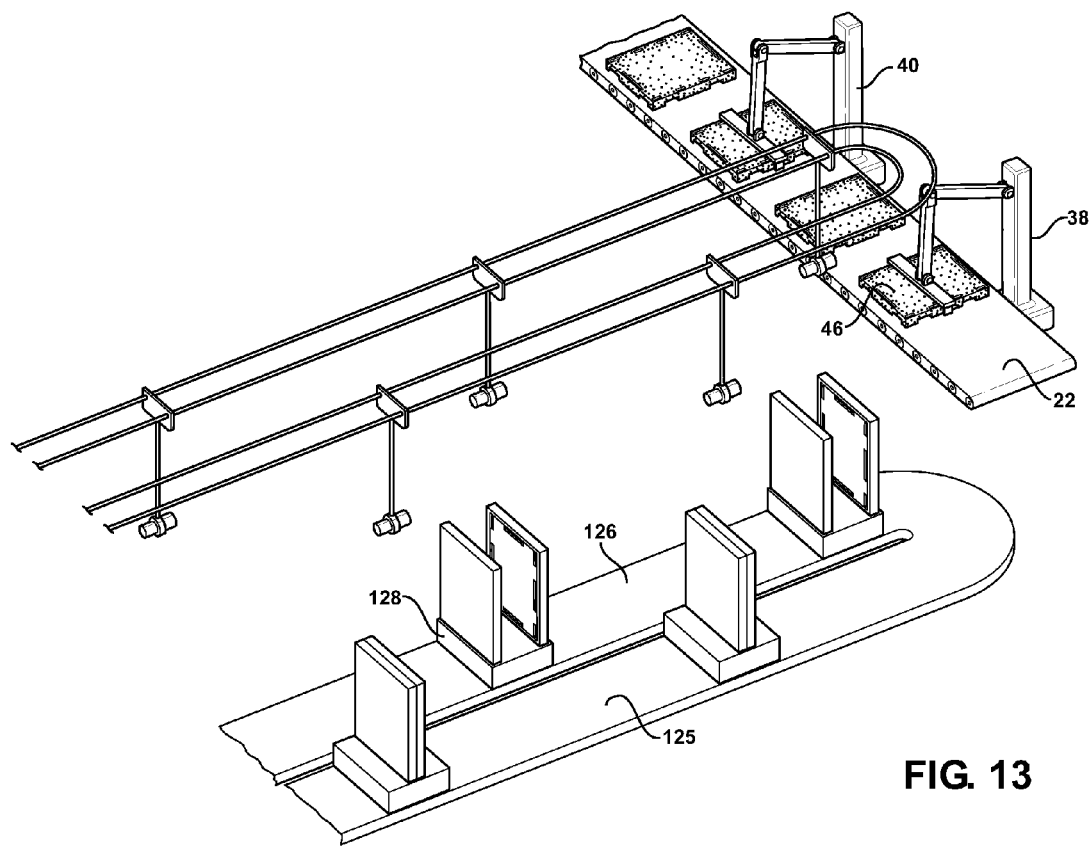
FIG. 13 is a further succeeding illustration in which the second transfer assembly is articulated to permit its gripping portion to deposit the finished article upon the output line.

Shown in FIG. 12 is previously identified second automated acquisition and transfer mechanism 38 and which is again located in communication with both the carousel subassembly 118 and a location of the output line 22. The selected mechanism 38 is shown fully extended to permit its associated gripping portion to receive the finished article from the carrier arm 78'. Finally, and referring to FIG. 13, a further succeeding illustration is shown in which the second transfer assembly 38 is articulated to permit its gripping portion to deposit the finished article 46 upon the output line for removal from the process.

Figure 14:
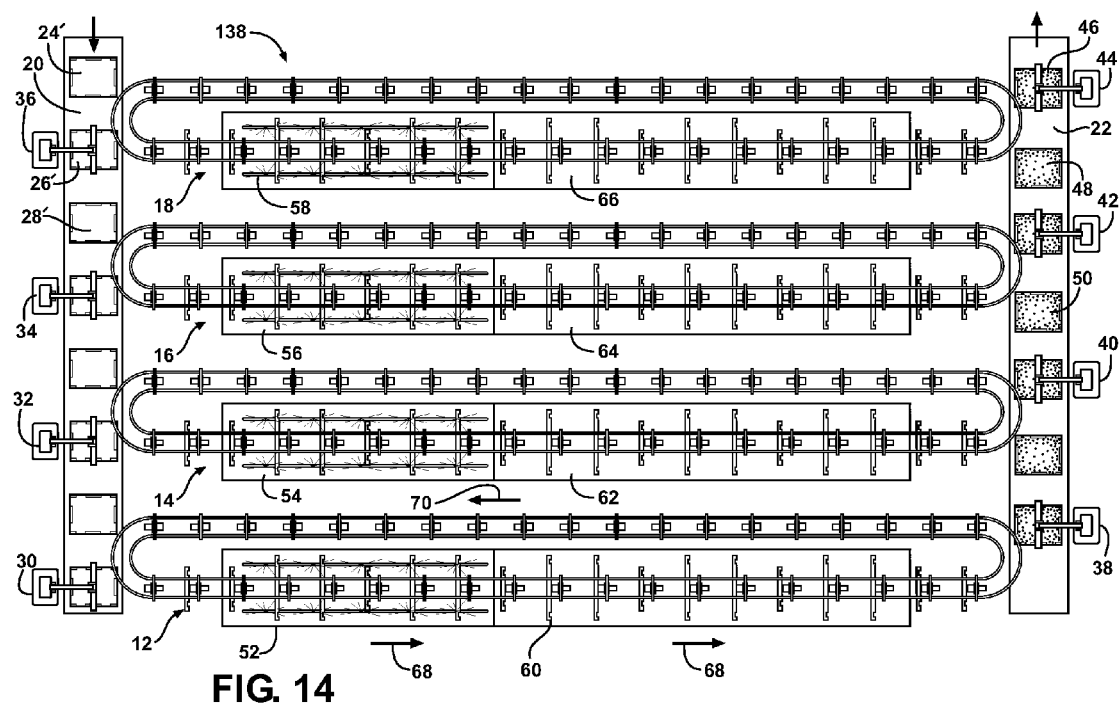
FIG. 14 is an overhead illustration of a modified spray applicating process incorporating electromagnetic force generation for creating resultant electrostatic holding forces between a metal coated insert and an oppositely charged and metal impregnate associated with the two part resin spray according to a third embodiment and in which a plurality of individual carousel assembly lines extend in a continuous looped fashion between an insert supporting input line and a finished article output line.
Figure 15:
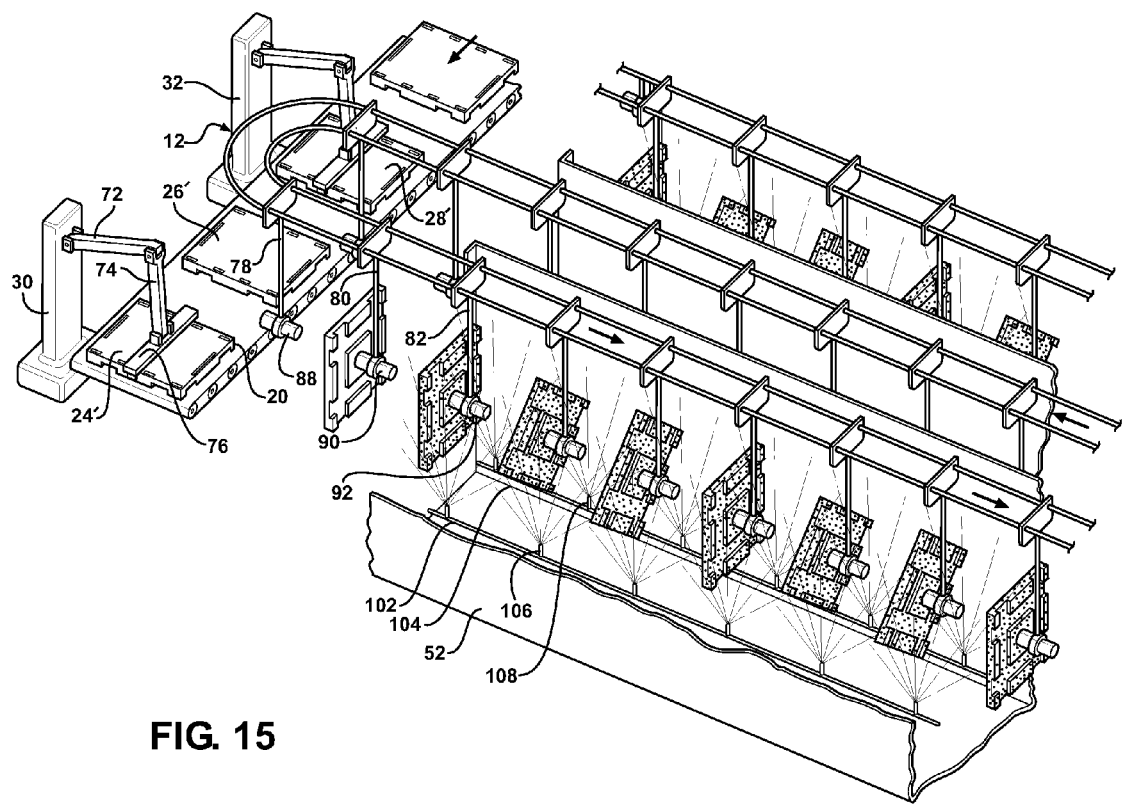
FIG. 15 is an illustration of a generally input side of a selected carousel assembly line and which illustrates a first automated acquisition and transfer assembly located in communication with both a selected carousel assembly line and a location of the input line, the first automated assembly being articulated to permit an associated gripping portion to acquire a selected insert coated with a charged metal from the input line and place the same upon a carrier supported by the carousel assembly line, as well as illustrating a spray booth enclosing an assembly portion of the carousel line for applying a two part resin and hardener and within which is impregnated an oppositely charged metal chip or particulate and for causing more even adherence and coating of the resin upon the insert while it is supported upon the carrier and translated through the booth interior in a progressively rotating fashion.
Figure 16:
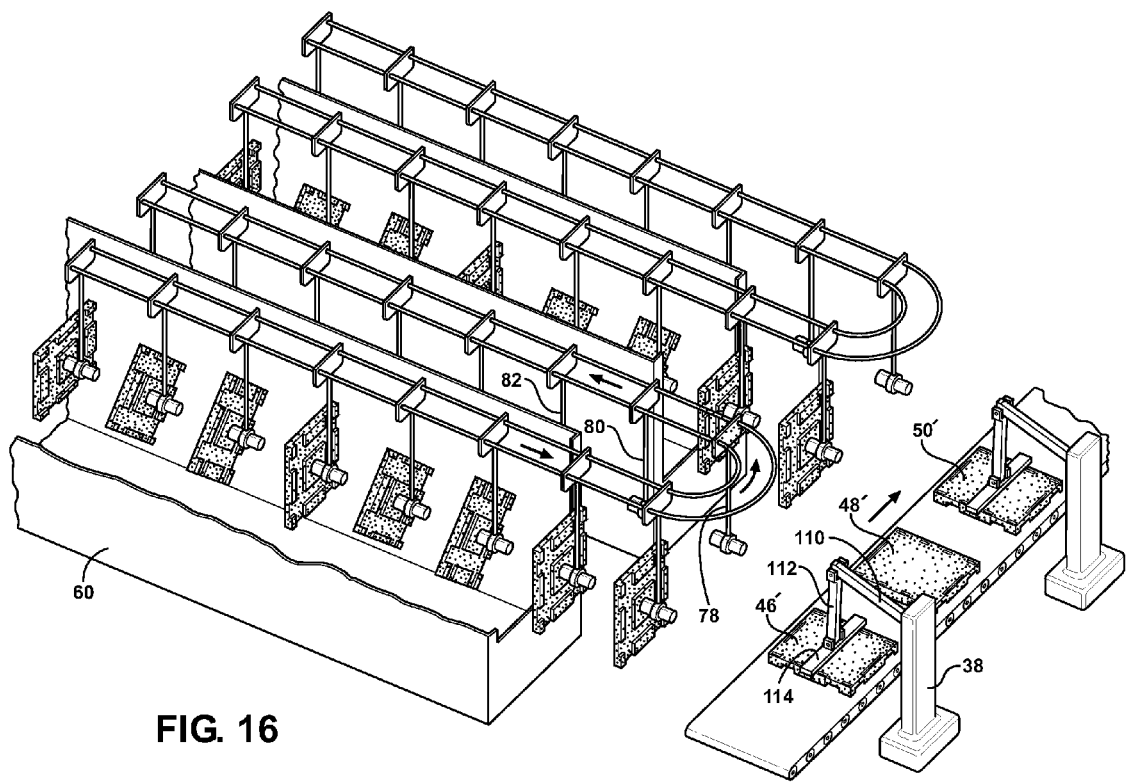
FIG. 16 is a succeeding illustration of an output side of the assembly similar to that previously shown in FIGS. 6 and 7 of the first embodiment and in which a second automated acquisition and transfer assembly is located in communication with a both the selected carousel and a location of the output line, the second assembly being fully extended so that the associated gripping portion acquires a finished resin coated article from the carrier and subsequently articulated to permit the gripping portion to deposit the finished article upon the output line.

Finally, FIG. 14 illustrates an overhead representation at 138 which is functionally and structurally identical in every regard to that previously identified at 10 in FIG. 1, with the exception that the embodiment of FIGS. 14-16 incorporate the physical properties of Coulumb's law, and which are directed to the application of oppositely charged metallic components incorporated in the individual inserts and resin spray, this in order to promote the physical phenomena of electrostatic adherence of the metal components by virtue of the electromagnetic force generation fields imparted. As will be described, the ability to utilize electrostatic holding forces can be manipulated to promote even and consistent spray resin building up and adherence during the coating process.

FIG. 15 is an illustration of a generally input side of a selected carousel assembly line 12 (functionally identical that that previously shown and described in FIG. 4 in the first described embodiment) and which illustrates a first automated acquisition and transfer mechanism 30 located in communication with both selected carousel assembly line 12 and a location of the insert supporting input line 20. As before, the first automated mechanism 30 is articulated to permit an associated gripping portion 76 to acquire a selected insert, in this illustration shown at 24' and which is coated with a relatively thin layer of a charged metal.

The insert 24' is thus removed from the input line and placed upon a selected carrier arm (e.g. 78, 80, 82, et seq.) and associated spindle (88, 90, 92, et seq.) supported by the carousel assembly line. The spray booth 52 is functionally similar to that previously described in FIG. 1, with the exception that it is reconfigured as an electro-magnetic force field generating booth and which utilizes known technology for accomplishing this.

Although not clearly shown, the spray booth applies a two part resin and hardener which is impregnated an oppositely charged metal chip or particulate as representatively shown in FIG. 15 by spray pattern issued by nozzles 106 and 108. The metal chip can exhibit any size suitable for being admitted through the nozzles, without clogging the same, and can extend down to micron sized particles which are evenly admixed and entrained within the two-part resin and hardener.

Upon oppositely charging the metal flakes or granules entrained within the resin, and relative to the surface applied metal coating associated with the inserts 24', 26', 28' et. seq., the particles and their agglomerated/surrounding resin matrix is caused to evenly adhere and coat upon the insert while it is supported upon the carrier and translated through the spray booth interior, again such as in a progressively rotating fashion. Following spray application, the oppositely charged/adhering first metal surface (applied to inserts) and second metal impregnated resin proceeds through the dry/cure oven.

Referring finally to FIG. 16, a succeeding illustration of an output side of the assembly is shown similar to that previously shown in FIGS. 6 and 7 of the first embodiment, and in which identified second automated acquisition and transfer mechanism 38 is located in communication with a both the selected carousel 12 following the dry/cure oven, eg. again at 60 for selected carousel 12, and a location of the output line 22. As previously described, the second mechanism 38 is fully extended so that its associated gripping portion acquires a finished resin coated article (see as representatively shown by metal entrained and coated resin articles 46', 48', 50' et seq. supported upon the output line 22) from the selected carrier 78 and subsequently articulates to permit the gripping portion to deposit the finished article upon the output line 22.

A corresponding method for producing a resin coated article is also provided and includes the steps of conveying an insert along an input line, transferring the insert to a carousel, advancing the insert to a first location for applying a resin material, further advancing the insert to a second location for curing the resin material around the insert, and depositing the coated article upon an output line. Additional steps include applying the resin as a spray within a booth through which the insert is conveyed.

Other steps include rotating the inserts while supported upon the carousel, as well as advancing the insert through a dry booth succeeding the spray booth. Alternative to the dry booth, the insert can be transferring from the carousel to a clamshell mold, following which the carousel reacquires the insert and prior to removal by the second lift and transfer mechanism. A subset step includes conveying the clamshell mold upon a secondary conveyor positioned underneath the carousel and, when necessary retiring the mold to a maintenance/repair area as needed.

Yet additional steps provide for utilizing electromagnetic generated electrostatic holding forces for accomplishing more even and consistent application of the spray resin material to the insert. This includes the steps of applying a first metal coating to the insert, intermixing a second metal particulate within the resin material, oppositely charging each of the metals, and spray applying the resin to the insert in order to create an electrostatic holding force there-between and to influence even coating and adherence of the resin across both upper and lower surfaces of the insert.

Having described my invention, other and additional preferred embodiments will become apparent to those skilled in the art to which it pertains, and without deviating from the scope of the appended claims.

I claim:

1. A method for mass producing pluralities of resin coated articles, comprising the steps of:
   conveying a plurality of planar inserts along an input line;
   elevating selected inserts in successive and repetitive fashion from at least one location along the input line;
   transferring the inserts in a vertical suspended fashion to a receiving location of at least one elongated and closed loop carousel extending between the input line and an output line located at an opposite end of the carousel;
   advancing the inserts along the carousel to a first location between the input and output lines;
   applying a resin material about an exterior of each insert at the first location;
   further advancing the inserts to a second location;
   curing the resin material around the inserts at the second location in order to form coated articles; and
   demounting the coated articles from the carousal and subsequently depositing them upon the output line.

2. The method as described in claim 1, said step of applying a resin material further comprising the step of spraying a two part resin and hardener within a spray booth through which the inserts are conveyed.

3. The method as described in claim 2, said step of curing further comprising the step of advancing the inserts through a dry booth succeeding said spray booth.

4. The method as described in claim 2, further comprising the step of transferring the inserts from the carousel to a selected one of a progression of advancing clamshell molds supported upon a conveyor positioned underneath the carousel for curing subsequent to said spray booth.

5. The method as described in claim 4, further comprising the step of said carousel reacquiring the inserts following curing within the clamshell mold.

6. The method as described in claim 1, further comprising the step of rotating the inserts while supported upon the carousel.

7. The method as described in claim 1, said step of applying a resin material further comprising the steps of:
    applying a first metal coating to the inserts;
    intermixing a second metal particulate within the resin material;
    oppositely charging each of the metals; and
    spray applying the resin to the insert in order to create an electrostatic holding force there-between and to influence even coating and adherence of the resin across both upper and lower surfaces of the inserts.

8. A method for mass producing pluralities of resin coated articles, comprising the steps of:
    conveying a plurality of planar inserts along an input line;
    elevating selected inserts in successive and repetitive fashion from each of a plurality of spaced locations along the input line;
    transferring the inserts in a vertical suspended fashion to a receiving location of each of a plurality of elongated and closed loop carousels extending between the input line and an output line located at an opposite end of the carousel;
    advancing the inserts along the carousels to a first location between the input and output lines;
    applying a resin material about an exterior of each insert at the first location;
    further advancing the inserts to a second location;
    curing the resin material around the inserts at the second location in order to form coated articles; and
    demounting the coated articles from the carousals and subsequently depositing them upon the output line.

9. The method as described in claim 8, said step of applying a resin material further comprising the step of spraying a two part resin and hardener within a spray booth through which each carousel passes and through which the inserts are conveyed.

10. The method as described in claim 9, said step of curing further comprising the step of advancing the inserts through a plurality of dry booths succeeding said spray booths.

11. The method as described in claim 9, further comprising the step of transferring the inserts from the carousels to a selected one of a progression of advancing clamshell molds supported upon each of a further plurality of conveyors positioned underneath each of the carousels for curing subsequent to said spray booths.

12. The method as described in claim 11, further comprising the step of said carousels reacquiring the inserts following curing within the clamshell molds.

13. The method as described in claim 8, further comprising the step of rotating the inserts while supported upon each of the carousels.

14. The method as described in claim 8, said step of applying a resin material further comprising the steps of:
    applying a first metal coating to the inserts;
    intermixing a second metal particulate within the resin material;
    oppositely charging each of the metals; and
    spray applying the resin to the insert in order to create an electrostatic holding force there-between and to influence even coating and adherence of the resin across both upper and lower surfaces of the inserts.

\* \* \* \* \*